United States Patent
Coeckelbergs et al.

(10) Patent No.: US 10,550,844 B2
(45) Date of Patent: Feb. 4, 2020

(54) METHOD FOR PREVENTING CONDENSATE IN THE OIL OF AN OIL-INJECTED COMPRESSOR AND COMPRESSOR IN WHICH SUCH A METHOD IS APPLIED

(71) Applicant: ATLAS COPCO AIRPOWER, N.V., Wilrijk (BE)

(72) Inventors: Joeri Coeckelbergs, Wilrijk (BE); Kenneth Alexander De Vocht, Wilrijk (BE); Andries Jan F. Desiron, Wilrijk (BE)

(73) Assignee: ATLAS COPCO AIRPOWER N.V., Wilrijk (BE)

( * ) Notice: Subject to any disclaimer, the term of this patent is extended or adjusted under 35 U.S.C. 154(b) by 481 days.

(21) Appl. No.: 15/110,436

(22) PCT Filed: Jan. 8, 2015

(86) PCT No.: PCT/BE2015/000002
§ 371 (c)(1),
(2) Date: Jul. 8, 2016

(87) PCT Pub. No.: WO2015/103678
PCT Pub. Date: Jul. 16, 2015

(65) Prior Publication Data
US 2016/0327045 A1    Nov. 10, 2016

Related U.S. Application Data (60) Provisional application No. 61/925,902, filed on Jan. 10, 2014.

(30) Foreign Application Priority Data

Feb. 13, 2014 (BE) .................................. 2014/0095

(51) Int. Cl.
*F04C 29/02*    (2006.01)
*F04C 28/06*    (2006.01)
(Continued)

(52) U.S. Cl.
CPC ............ *F04C 29/021* (2013.01); *F04C 18/16* (2013.01); *F04C 27/02* (2013.01); *F04C 28/06* (2013.01);
(Continued)

(58) Field of Classification Search
CPC ...... F04C 29/021; F04C 29/026; F04C 18/16; F04C 27/02; F04C 28/06; F04C 29/0014;
(Continued)

(56) References Cited

U.S. PATENT DOCUMENTS 4,358,247 A * 11/1982 Suzuki .................... F04C 28/26
                                                                417/13
6,202,424 B1   3/2001 Hattori et al.
(Continued)

FOREIGN PATENT DOCUMENTS

DE       43 13 573 A1    10/1994
DE  10 2005 010 690 A1    9/2006
(Continued)

OTHER PUBLICATIONS

Communication dated May 2, 2018, from the European Patent Office in counterpart application No. 15710412.6.
(Continued)

*Primary Examiner* — Philip E Stimpert
(74) *Attorney, Agent, or Firm* — Sughrue Mion, PLLC (57) ABSTRACT

Method for preventing condensate in the oil of an oil-injected compressor (1), characterised in that before the compressor element (2) is stopped, when the maximum pressure (pmax) in the consumer network (16) has been reached, the compressor element continues to be driven until the temperature (T) of the oil or the compressed gas is lower than a set fixed or calculated minimum value (Tmin) above which there is no or as little condensate as possible in the oil.

18 Claims, 5 Drawing Sheets

(51) Int. Cl.
*F04C 18/16* (2006.01)
*F04C 27/02* (2006.01)
*F04C 29/00* (2006.01)
*F16N 29/02* (2006.01)

(52) U.S. Cl.
CPC ........ *F04C 29/0014* (2013.01); *F04C 29/026* (2013.01); *F04C 2270/19* (2013.01); *F16N 29/02* (2013.01)

(58) Field of Classification Search
CPC ............ F04C 2270/19; F04C 2270/195; F16N 29/02; F16N 2230/00; F16N 2230/02; F16N 2270/72; F04B 39/02; F04B 39/0207; F04B 53/13
See application file for complete search history.

(56) References Cited

U.S. PATENT DOCUMENTS

2009/0041589 A1† 2/2009 Liebert
2010/0111707 A1* 5/2010 Hamdan ................ F04B 49/06
417/44.1

FOREIGN PATENT DOCUMENTS

| EP | 1 475 586 | A2 | | 11/2004 |
|---|---|---|---|---|
| GB | 2 277 462 | A | | 11/1994 |
| GB | 2277462 | A | † | 11/1994 |
| JP | 58-88489 | A | | 5/1983 |
| JP | 6-49788 | U | | 7/1994 |
| JP | H08-319976 | A | | 12/1996 |
| JP | 9-287580 | A | | 11/1997 |
| JP | 11201039 | A | * | 7/1999 |
| JP | H11-201039 | A | | 7/1999 |

OTHER PUBLICATIONS

Communication dated Jul. 18, 2017, from European Patent Office in counterpart application No. 15710412.6.
Communication (The Third Party Observation) dated Dec. 8, 2017, from European Patent Office in counterpart application No. 15710412.6.
Communication dated Jan. 15, 2018, from the Japanese Patent Office in counterpart application No. 2016-545791.
International Search Report for PCT/BE2015/000002 dated Jun. 26, 2015.
Written Opinion for PCT/BE2015/000002 dated Jun. 26, 2015.

* cited by examiner
† cited by third party

METHOD FOR PREVENTING CONDENSATE IN THE OIL OF AN OIL-INJECTED COMPRESSOR AND COMPRESSOR IN WHICH SUCH A METHOD IS APPLIED

The present invention relates to a method for preventing condensate in the oil of an oil-injected compressor.

More specifically, the invention is intended for oil-injected compressors with a variable speed.

Such compressors comprise a compressor element, for example in the form of a screw compressor element with two meshed rotor screws that are mounted on bearings in a housing and which are driven by a drive with a variable speed that is a function of the load.

Such compressors are further provided with an oil circuit that is provided to inject oil into the compressor element for lubricating and cooling the rotor screws and for sealing the clearance between the rotors themselves and between the rotors and the housing.

The injected oil leaves the compressor element as a mist of oil droplets in the compressed gas, which, before being supplied to the consumer network, is driven through an oil separator to separate and receive the oil and to inject the oil, optionally after cooling, back into the compressor element.

Known compressors of this type comprise a controller to control the speed as a function of the demanded flow rate and the demanded pressure in the downstream consumer network. When the pressure in the consumer network has reached a set value, then the aforementioned controller ensures that the compressor element is stopped according to a specified stop program whereby the speed of the compressor element decreases to a set minimum speed and whereby, when this minimum speed is reached, the drive of the compressor element is switched off.

The compressed gas that leaves the compressor element and is driven through the oil separator also contains a quantity of water vapour in addition to oil droplets.

A disadvantage is that there is a risk that when the temperature of the compressed gas at the outlet of the compressor element is not high enough, for example with a low load and when the compressor element is stopped, the water vapour in the compressed gas will condense and get in the oil which can lead to damage when the compressor element is restarted.

The purpose of the present invention is to provide a solution to the aforementioned disadvantage and other disadvantages.

To this end the invention concerns a method for preventing condensate in the oil of an oil-injected compressor, comprising an oil-injected compressor element with an inlet that can be closed by means of a controlled inlet valve and an outlet; a drive for the compressor element; an oil circuit comprising an oil separator with an input that is connected to the outlet of the compressor element and an output to which a consumer network for compressed gas can be connected, whereby this oil separator comprises a pressure vessel in which the oil separated from the compressed gas is collected and from where oil can be injected into the compressor element; a controller for the drive of the compressor element that is such that when the pressure in the consumer network has reached a set maximum value, the drive of the compressor element is stopped according to a set stop program, with the characteristic that before the drive of the compressor element is stopped when the maximum pressure in the consumer network has been reached, the method comprises the following steps:

the determination of the temperature of the compressed gas or of the oil;

when this temperature is higher than a set fixed or calculated minimum value to prevent condensate in the oil as much as possible, the stopping of the drive of the compressor element according to the set stop program;

when this temperature is lower than the aforementioned set fixed or calculated minimum value, the drive is not immediately stopped but continues to drive with an open inlet valve according to a recirculation program in the controller in order to continue compressing gas and recirculate this compressed gas from the oil separator via a recirculation pipe to the inlet of the compressor element in order to raise the temperature until the aforementioned minimum temperature has been reached and then to stop the drive, possibly after a set minimum period and/or with any stop delay, according to the set control program or after expiry of a set maximum period if the minimum temperature has not been reached after this maximum period.

Thanks to this method the compressor element is not immediately stopped when the set operating pressure in the consumer network has been reached, as is usually the case, but it is first checked whether the temperature of the oil in the pressure vessel is sufficient so as not to have condensate in the oil, and when the temperature is insufficient a recirculation program is first completed during which the compressor element continues running at a minimum speed in order to continue compressing gas, which after compression is guided from the pressure vessel to the inlet of the compressor element in order to be compressed again from there.

Thus during the recirculation program the same gas is always compressed again and is driven around in a circuit over the pressure vessel, such that the compressed gas is heated and therewith also the oil in the pressure vessel.

When the oil is heated sufficiently to enable all the moisture in the oil to evaporate, the stop program is completed in order to stop the compressor in the usual way, if need be with a certain delay during which the compressor element continues to run in recirculation to ensure homogeneous heating of the oil.

The fact that the oil has heated sufficiently is most easily evaluated in practice on the basis of the temperature of the compressed gas that is measured or determined at the outlet of the compressor element, whereby this temperature forms a good indication of the temperature of the oil in the pressure vessel.

The minimum temperature above which there is no further risk of condensate in the oil primarily depends on the condensation temperature. The higher the set minimum temperature, the lower the risk of the presence of condensate in the oil.

The value of the minimum temperature is in all respects set at a fixed or calculated value that is lower than the temperature to which the thermostatic valve is set, which is generally present and which ensures that when the oil is cold, for example when starting up, the oil is injected directly into the compressor element and when the oil is warm, the oil is first guided around from the pressure tank along an oil cooler.

In practice this means that a minimum temperature is set that is as high as possible but lower than the temperature of the thermostatic valve, at least insofar there is a thermostat, whereby in practice this temperature is between 60° C. and 90° C., for example around 70° C.

The minimum temperature can also be determined in real time on the basis of the condensation temperature, which can be calculated on the basis of the measured ambient temperature and relative humidity in real time for example.

Protection built into the recirculation program ensures that if the desired minimum temperature cannot be reached, the compressor will nonetheless be stopped after a set minimum period.

Another protection facility ensures that if the oil heats up too quickly during the recirculation program, the drive is immediately stopped when a set maximum temperature is reached.

Preferably the compressed gas is recirculated over a calibrated throttle during the recirculation program in order to obtain a pressure in the pressure vessel that is lower than the pressure to which the minimum pressure valve of the pressure vessel is set in order to prevent compressed gas being supplied to the consumer network at this stage on the one hand, and so that a minimum internal pressure is guaranteed for oil injection to the compressor element on the other.

After completing the recirculation program the recirculation pipe is closed again and the drive is stopped after a set stop delay, whereby this stop delay ensures that sufficient pressure is built up in the pressure vessel that is required for the control of the inlet valve, as is usual.

The invention also relates to a compressor that is arranged to be able to implement the method of the invention, comprising an oil-injected compressor element with an inlet that can be closed by means of a controlled inlet valve and an outlet; a drive for the compressor element; an oil circuit comprising an oil separator with an input that is connected to the outlet of the compressor element and an output to which a consumer network for compressed gas can be connected, whereby this oil separator comprises a pressure vessel in which the oil separated from the compressed gas is collected and from where oil can be injected into the compressor element via an injection pipe; a pressure sensor for determining the pressure in the consumer network and a controller for the drive of the compressor element that is such that when the pressure in the consumer network has reached a set maximum value, the drive of the compressor element is stopped according to a set stop program, with the characteristic that the compressor is provided with a temperature probe for determining the temperature of the compressed gas or the oil, and a 'recirculation pipe' that connects the oil separator to the inlet of the compressor element and in which a throttle and a controlled normally closed closable recirculation valve is incorporated that is connected to the aforementioned controller that is such that before the drive of the compressor element is stopped when the maximum pressure in the consumer network has been reached, the recirculation valve opens when the temperature determined by the temperature probe is lower than a set fixed or calculated minimum value and the drive continues to be driven until the temperature reaches the minimum value or a set maximum period has lapsed in order to then stop the drive, with a delay if need be.

With the intention of better showing the characteristics of the invention, a preferred application of a method according to the invention for preventing condensate in the oil of an oil-injected compressor and of such a compressor in which this method is applied are described hereinafter by way of an example, without any limiting nature, with reference to the accompanying drawings, wherein.

Figure 1:
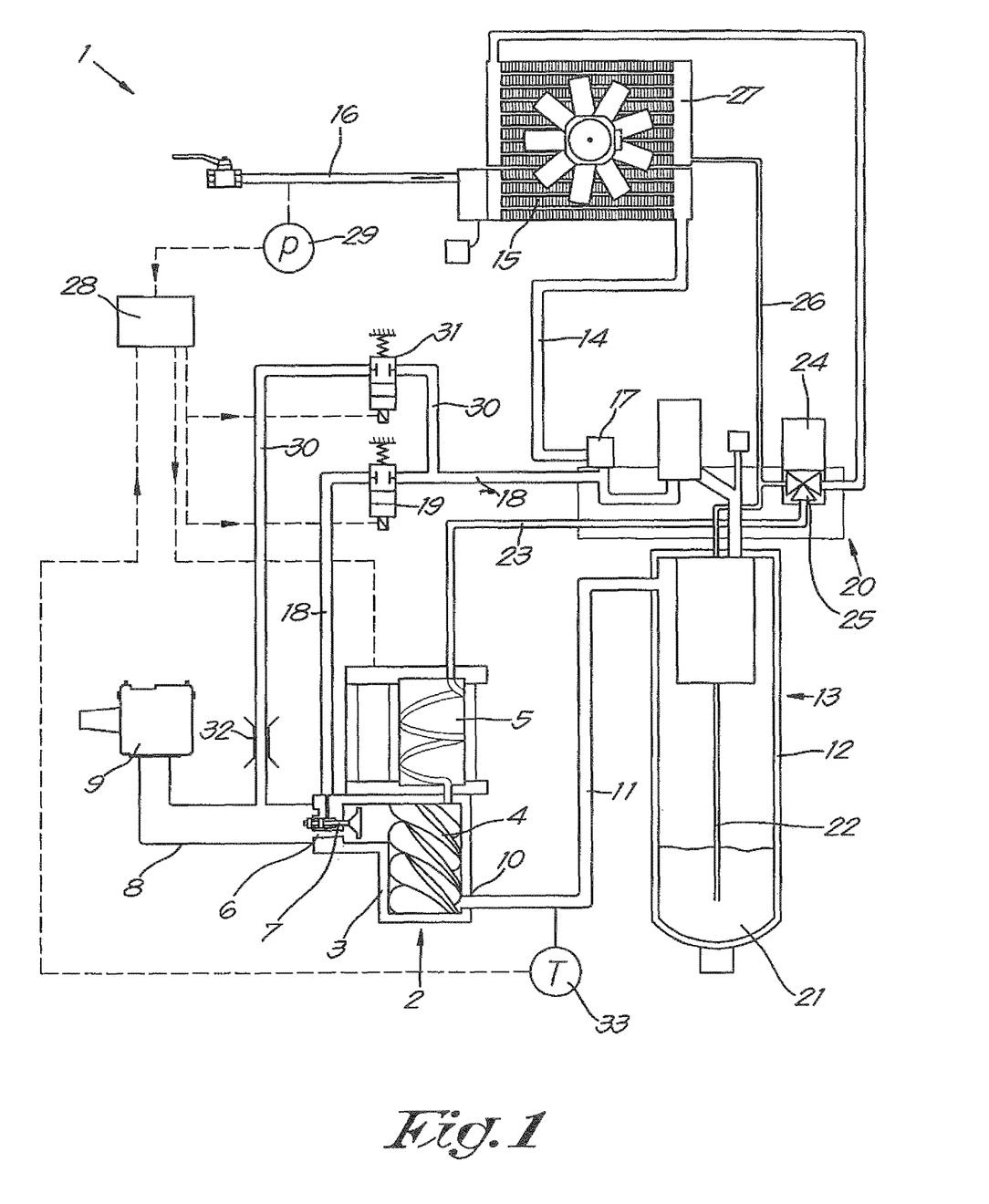
FIG. 1 schematically shows an oil-injected compressor according to the invention when stopped.

The installation shown in FIG. 1 concerns an oil-injected screw compressor 1 according to the invention, comprising a compressor element 2 of the known screw type with a housing 3 in which two meshed helical rotors 4 are driven by means of a drive 5.

The compressor element 2 is provided with an inlet 6 that can be closed by means of a controllable inlet valve 7, whereby this inlet 6 is connected to an inlet filter 9 by means of an intake pipe 8 to draw in gas, in this case air, from the environment.

The compressor element 2 is also provided with an outlet 10 and a pressure pipe 11 connected thereto that is connected to a downstream consumer network 16 via a pressure vessel 12 of an oil separator 13 and via a pressure pipe 14 and a cooler 15 for the supply of various pneumatic tools or similar that are not shown here.

At the output of the pressure vessel 12 a minimum pressure valve 17 is affixed in the pressure pipe 14 that only opens when the pressure in the pressure vessel 12 reaches a set minimum value pmin.

A release branch 18 is provided in the pressure vessel 12 that opens out at the location of the inlet 6 and which can be closed by means of a release valve 19 in the form of a spring-loaded controllable electric valve that is normally kept closed by means of a spring.

The screw compressor 1 is provided with an oil circuit 20 to inject oil 21 into the compressor element 2 from the pressure vessel 12 under the influence of the pressure in the pressure vessel 12 via a lifting pipe 22 in the pressure vessel 12 and injection pipe 23 for lubrication and/or cooling and/or sealing between the rotors 4 themselves and the rotors 4 and the housing 3.

The oil 21 that is driven from the pressure vessel 12 to the injection pipe 23 can be guided around through an oil cooler 27 via an oil filter 24 and thermostatic valve 25 via a branch pipe 26 to cool the oil 21 from the pressure vessel 12.

In the example shown, although not strictly necessary, the cooled oil is guided over the drive 5 before being injected into the compressor element 2 in order to cool this drive 5.

In this case the drive 5 is a drive with a variable speed n that is controlled as a function of the load of the consumer network 16, more specifically as a function of the pressure and the flow of gas taken off by the consumer network 16.

This drive 5 is controlled in a known way by an electrical or electronic controller 28 as a function of the aforementioned pressure in the consumer network 16, whereby this pressure is determined by means of a pressure sensor 29 or similar for example.

The controller 28 also ensures the control of the opening and closing of the release valve 19.

It is characteristic of the invention that the compressor 1 is also equipped with a recirculation pipe 31 that connects the pressure tank 12 to the inlet 6 of the compressor element 2 and which can be closed by means of a recirculation valve 31, in this case in the form of a controlled spring-loaded normally closed electric valve.

In the recirculation pipe 30 there is a calibrated throttle 32 that is calculated in order to have a pressure in the pressure tank 12, when the recirculation valve 31 is opened, that is lower than the minimum pressure pmin to which the minimum pressure valve 17 is set.

This recirculation valve 31 is connected to the controller 28 to control the recirculation valve 31, primarily as a function of the pressure p measured by the aforementioned pressure sensor 29 and as a function of the temperature T of the compressed gas at or in the outlet 10 of the compressor element 2, whereby this temperature T is measured for example using a temperature sensor 33 whose signal is fed back to the controller 28.

The method according to the invention can be explained as follows.

When starting up the drive 5 the compressor 1 is in a starting situation as shown in FIG. 1, whereby the inlet valve 7 is open and the release valve 19 and the recirculation valve 31 are both in a closed state in order to close off the release pipe 18 and the recirculation pipe 30. The pressure tank 12 is then partially filled with oil 21.

During operation, air with the water vapour present therein is drawn in from the environment via the inlet 8 and compressed in the compressor element 2.

The pressure in the pressure vessel 12 then starts to rise and ensures that oil 21 is injected from the pressure tank 12 via the injection pipe 23 into the compressor element 2, whereby the oil, depending on the temperature of the oil and the position of the thermostatic valve 25, is driven directly to the injection pipe 23 in order to be diverted via the oil cooler 27. The thermostatic valve 25 is set to a temperature T25 of 70° C. for example.

The oil present in the compressed air is separated in the oil separator 13 and collected in the pressure tank 12.

As soon as the pressure tank 12 has reached the aforementioned minimum pressure or a sufficient pressure to overcome the counterpressure in the consumer network 16, the minimum pressure valve 17 opens and compressed air is supplied to the consumer network, after prior cooling in the cooler 15.

The pressure p in the consumer network is measured with the pressure probe 29 from which the signal is connected to the controller 28.

As soon as the pressure p in the consumer network has reached a set value pmax, the controller 28 gives a signal to stop the drive according to a specified stop program. 34.

With a conventional compressor without recirculation in this case the speed n of the drive is slowed to a minimum set speed nmin and the drive is completely stopped as soon as this minimum speed nmin has been reached, whereby this speed is for example between 0 and 10,000 revolutions per minute, for example 2,100 revolutions per minute.

Figure 2:
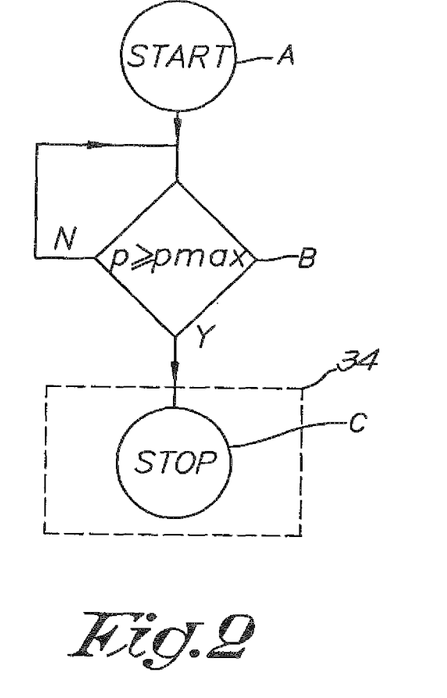
FIG. 2 shows the stop program of a conventional oil-injected compressor.

This is schematically shown in FIG. 2 whereby after starting up in step A from the situation in FIG. 1, in step B the pressure p in the consumer network is measured repeatedly or continuously and compared to the set maximum pressure pmax, after which as soon as the pressure p becomes greater than pmax, the stop program is started in step C.

Figure 3:
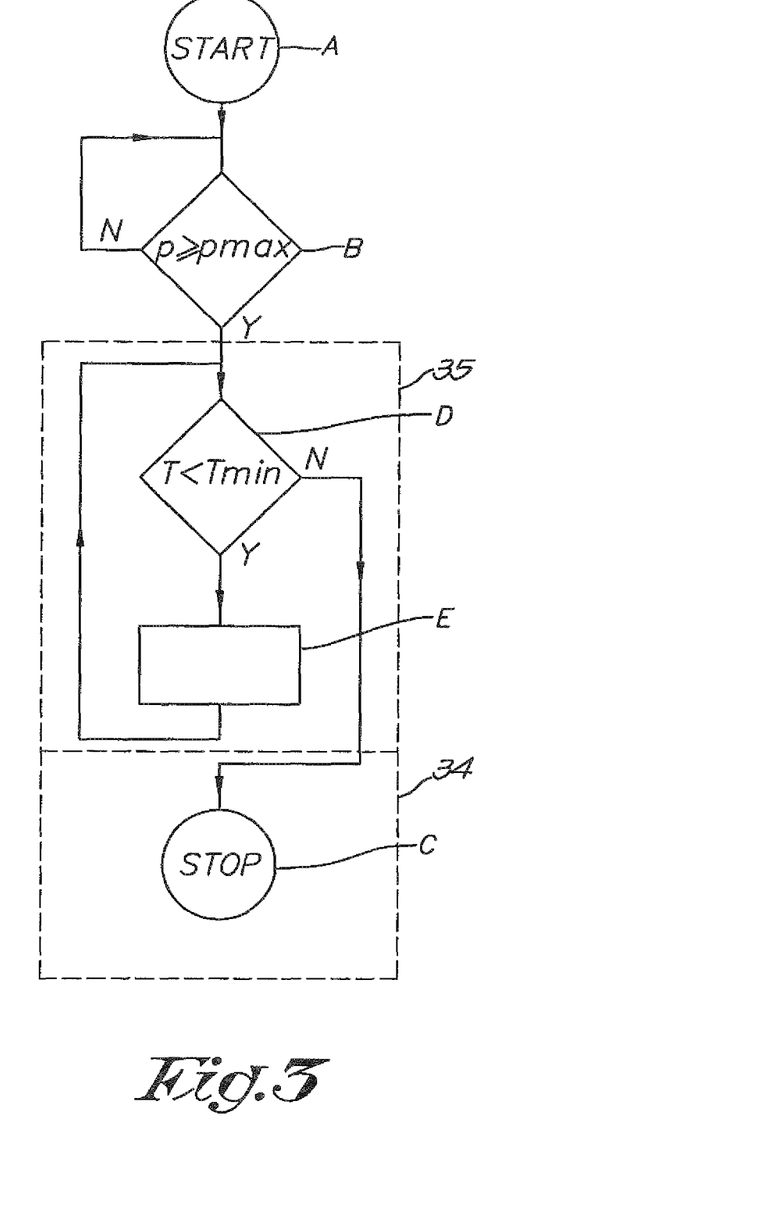
FIG. 3 shows an analogous diagram to that of FIG. 2, but for a compressor according to the invention.

In the case of the invention an additional recirculation program 35 runs between step B and step C, as schematically shown in FIG. 3. This recirculation program 35 is thus started as soon as the pressure p is equal to pmax.

During this recirculation program 35, in step D the temperature T is continuously or repetitively measured and compared to the set minimum temperature Tmin, above which there is no risk of condensate in the oil.

When the temperature T is lower than Tmin, the speed of the drive 5 is reduced to the set minimum value nmin and the recirculation valve 21 is opened, as shown by step E in the diagram of FIG. 3.

Figure 4:
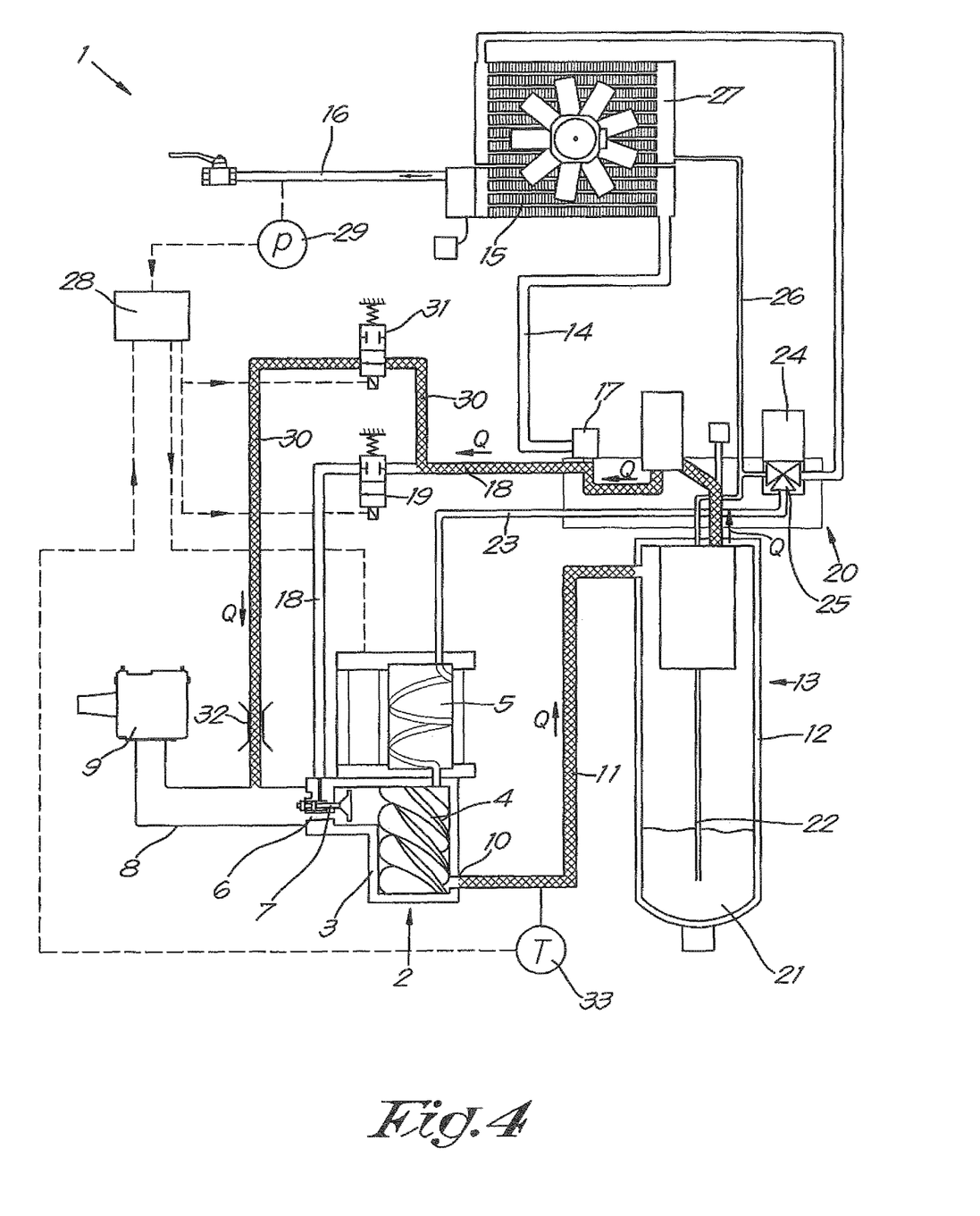
FIG. 4 shows the compressor of FIG. 1 during a state of use.

This situation is shown in FIG. 4.

The compressor element 2 thus continues to compress air at a minimum speed, whereby this compressed air is fed back from the pressure vessel 12 via the recirculation pipe 18 and the throttle 32 to the inlet 6 where it is again drawn in and compressed by the compressor element 2.

The throttle is calculated so that in this phase a pressure is realised in the pressure tank 12 that is less than the pressure value pmn to which the minimum pressure valve is set, so that no compressed air can escape to the consumer network.

The same air is thus driven around in a circuit as shown by the arrows Q in FIG. 4 and thus again drawn in and compressed, such that the temperature of this air increases and thereby also the temperature of the oil 21 in the pressure tank 12 until Tmin is reached.

Once Tmin has been reached, then from step D the step C is taken to start the stop program 34, as with a conventional compressor without recirculation.

During the stop program the drive is switched off and the recirculation valve 21 is closed again to return to the starting position.

The temperature T that is used for the recirculation program is preferably the temperature of the compressed gas that is measured or determined at the outlet of the compressor element.

The temperature in the outlet above which there is no or a minimal risk of the presence of condensate in the oil depends on the condensation temperature, which depends on the environmental variables in which the compressor 1 is operated.

The higher the set temperature Tmin the lower the risk. In every case Tmin must be lower than the temperature T25 to which the thermostatic valve 25 is set, at least insofar a thermostatic valve 25 is present, so that during the recirculation phase to warm up the oil the oil is not driven over the oil cooler 27.

The minimum temperature Tmin is then preferably set as close as possible below the aforementioned temperature T25 to which the thermostatic valve 25 is set, for example just below 70° C.

In practice this temperature Tmin is between 60° C. and 90° C.

Instead of a thermostatic valve 25 the compressor can also be equipped with an electronically controlled mixer tap, in which case the temperature to which the thermostatic valve 25 is set does not need to be taken into account.

It is not excluded measuring the temperature at a different place, for example in the oil 21 in the pressure tank and setting a corresponding Tmin.

Figure 5:
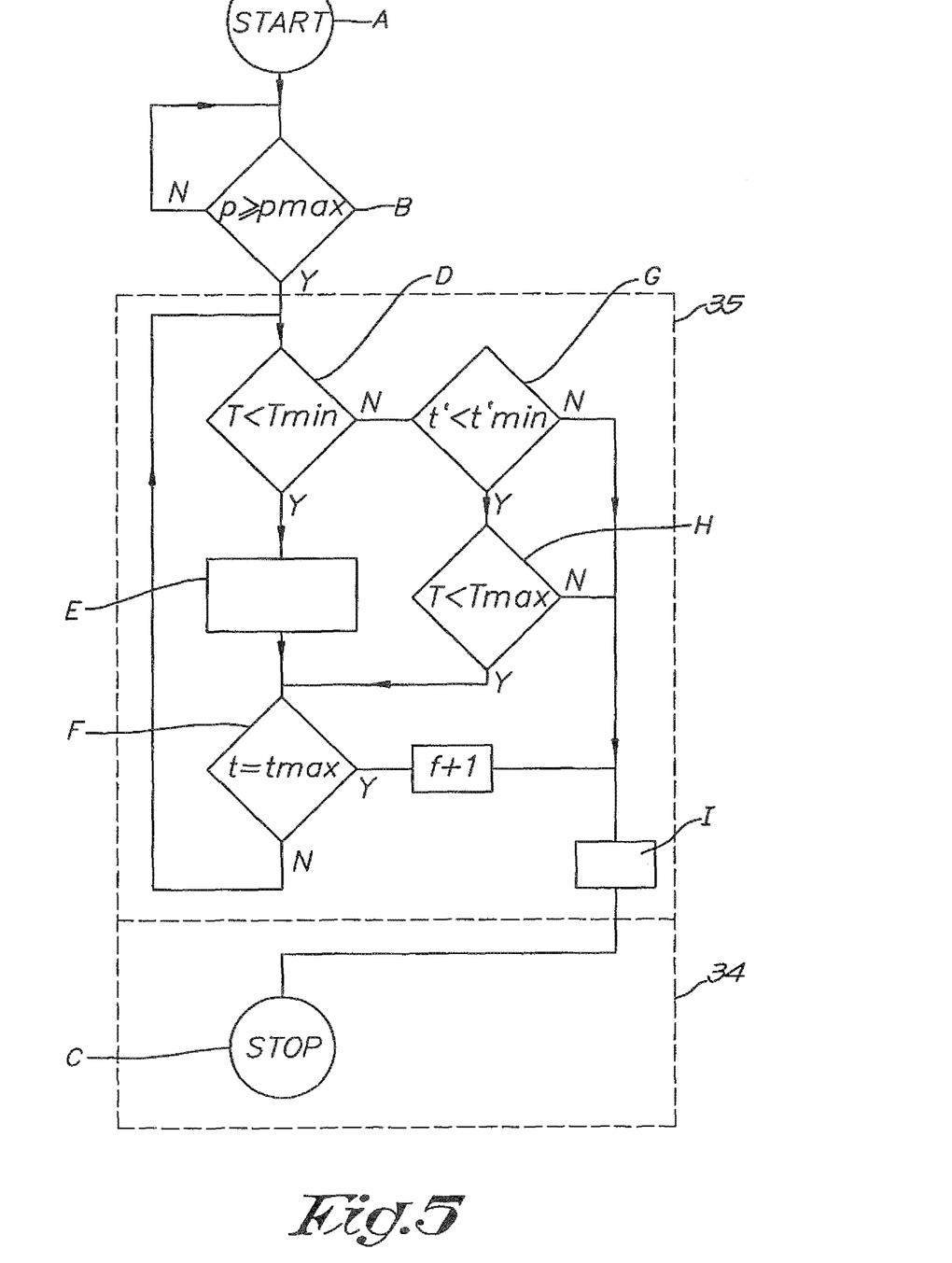
FIG. 5 shows a variant of the diagram of FIG. 3.

FIG. 5 shows a diagram such as that of FIG. 3, but with additional protection as explained hereinafter.

A maximum period tmax for the recirculation program is set in the controller 28. As long as the minimum temperature Tmin has not been reached, during the method step F it is checked whether the duration of the recirculation program 35 since the start of the reticulation program 35 has not exceeded the set maximum period.

If the temperature Tmin has not been reached within this period tmax it can be an indication that the ambient temperature is too low to reach the desired temperature Tmin or that the cooling capacity of the compressor 1 is too large.

In this case, after the maximum period tmax has been reached, the recirculation program is stopped and immediately transfers to step C in order to start the stop program and an error counter f is increased by one, whereby this error counter indicates how many times this situation has occurred.

The aforementioned maximum period tmax is set between 0 and 40 minutes for example, preferably approximately 600 seconds.

If during the recirculation program the temperature T does reach the set value Tmin, then as of then a timer is started that records the time t' since reaching Tmin, and which in step G lets the recirculation program continue for a set minimum period t'min before stopping the drive 5 in step C, in order to ensure uniform heating of the oil 21 in the pressure vessel 12.

The aforementioned minimum period t'min is set between 0 and 60 seconds for example, preferably approximately 10 seconds.

During the period t'min the temperature T is further monitored and the drive 5 is immediately stopped when a set maximum temperature Tmax is reached or exceeded that is higher than Tmin, in the event that the temperature T rises too quickly and the compressor cannot be stopped in time. This is shown by step H in FIG. 5.

The set maximum temperature Tmax is set to a value that is between 5° C. and 20° C. higher than the aforementioned set minimum temperature Tmin for example, preferably to a value that is approximately 10° C. higher than this set minimum temperature Tmin, and thus 80° C. for example.

At the end of the recirculation program 35 the recirculation valve 31 is closed before commencing the stop program 34.

During the stop program 34, according to a certain aspect of the invention the drive 5 can only be switched off with a certain stop delay Δt after the closing of the recirculation valve 31. The drive 5 then continues to run at the minimum speed nmin during this stop delay Δt, whereby this delay is between 0 and 40 seconds, preferably approximately 2 seconds.

The purpose of this stop delay Δt is to ensure that sufficient pressure is built up in the pressure vessel 12 to be able to act as a control pressure in order to be able to close the inlet valve 7 as usual.

According to another aspect of the invention, after closing the recirculation valve 31 and before the drive 5 is switched off, the controller 28 first checks whether the temperature T is higher than the set minimum temperature Tmin and if not opens the release valve 19 to remove the evaporated condensate from the compressor 1.

An additional protection can consist of immediately stopping the compressor if the pressure p in the consumer network 16 goes above a set value pstop that is set higher than the aforementioned value pmax, which can occur for example when the recirculation valve 31 is blocked, in which case the air will not be able to be recirculated and will thereby be able to escape via the minimum pressure valve 17 to the consumer network, such that the pressure p in the consumer network 16 could unintentionally rise above pmax.

Although the examples described above always concern a compressor element 2 with a drive 5 with a variable speed, the invention can also be used for compressor elements 2 with a fixed speed.

The present invention is by no means limited to the embodiment described as an example and shown in the drawings, but a method and a compressor according to the invention can be realised in all kinds of variants, without departing from the scope of the invention.

The invention claimed is:

1. A method for preventing condensate in the oil of an oil-injected compressor (1) comprising an oil-injected compressor element (2) with an inlet (6) that can be closed by means of a controlled inlet valve (7) and an outlet (10); a drive (5) for the compressor element (2); an oil circuit (20) comprising an oil separator (13) with an input that is connected to the outlet (10) of the compressor element (2) and an output to which a consumer network (16) for compressed gas can be connected, whereby this oil separator (13) comprises a pressure vessel (12) in which the oil (21) separated from the compressed gas is received and from where oil can be injected into the compressor element (2); a controller (28) for the drive of the compressor element (2) that is such that when the pressure (p) in the consumer network (16) has reached a set maximum value (pmax), the drive (5) of the compressor element (2) is stopped according to a set stop program (34), wherein before the drive (5) of the compressor element (2) is stopped when the maximum pressure (pmax) in the consumer network (16) has been reached, the method comprises the following steps:

determining the temperature (T) of the compressed gas or of the oil;

when this temperature (T) is higher than a set fixed or calculated minimum value (Tmin) to minimize condensate in the oil, stopping of the drive (5) of the compressor element (2) according to the set stop program (34);

when this temperature (T) is lower than the set fixed or calculated minimum value (Tmin), continuing to run the drive (5) with an open inlet valve (7) according to a recirculation program (35) in the controller (28) in order to continue compressing gas and recirculate this compressed gas from the oil separator (13) via a recirculation pipe (30) to the inlet (7) of the compressor element (2) in order to raise the temperature (T) until the fixed or calculated minimum temperature (Tmin) is reached and then stopping the drive (5), wherein the oil separator (3) provided with a minimum pressure valve (17) that is set to a minimum pressure value (pmin), and during the recirculation program (35) the pressure in the pressure vessel is controlled at a value that is lower than the pressure value (pmin) to which the minimum pressure valve (17) is set.

2. The method according to claim 1, wherein the control of the pressure in the oil separator (13) below the set pressure value (pmin) of the minimum pressure valve (17) is done by allowing the compressed gas to recirculate from the oil separator (13) through a calibrated throttle (32) to the inlet (7) of the compressor element (2).

3. The method according to claim 1, wherein during the execution of the recirculation program (35) the drive (5) of the compressor element (2) is immediately stopped when the temperature (T) is higher than a set maximum temperature (Tmax) that is higher than the set fixed or calculated minimum value (Tmin) of the temperature.

4. The method according to claim 1, wherein the set minimum temperature (Tmin) is determined periodically or in real time, based on the condensation temperature that is calculated on the basis of a measured ambient temperature and relative humidity.

5. The method according to claim 1, wherein the temperature (T) that is used for the recirculation program (35) is the temperature of the compressed gas that is measured or determined at the outlet (10) of the compressor element (2).

6. The method according to claim 5, wherein the oil is guided around by means of a thermostatic valve (25) in the oil circuit (20) via an oil cooler (27) if the temperature of the oil is higher than the temperature (T25) to which the thermostatic valve (25) is set, and the set minimum temperature (Tmin) is below this temperature (T25) to which the thermostatic valve (25) is set.

7. The method according to claim 6, wherein the set maximum temperature (Tmax) is between 5° C. and 20° C. higher than the set fixed or calculated minimum temperature (Tmin).

8. The method according to claim 1, wherein the drive (5) of the compressor element (2) is a drive with variable speed (n) and during the recirculation program (35) the speed (n) is reduced to a set minimum value (nmin) that is between 0 and 10,000 revolutions per minute.

9. The method according to claim 1, wherein after execution of the recirculation program (35) the recirculation pipe (30) is closed and then the drive (5) is switched off with a certain stop delay (Δt), whereby this stop delay (Δt) is between 0 and 40 seconds.

10. The method according to claim 9, wherein the compressor (1) is provided with a closable release branch (18) to release the compressed gas from the oil separator (13) into the environment, and after stopping the drive (5) in a subsequent step a check is made whether the temperature (T) of the compressed gas or of the oil is higher than the set minimum value (Tmin), and if not the release branch (18) is opened to release gas.

11. The method according to claim 1, wherein the stop program (34) includes decreasing a speed (n) of the compressor element (2), when the maximum pressure value in the consumer network has been reached, to a set minimum value (nmin), after which, insofar the temperature (T) of the compressed gas or the oil is higher than the set fixed or calculated minimum value (Tmin), the drive (5) is switched off.

12. The method of claim 1, wherein the stopping of the drive occurs after a set minimum period (t'min) and/or with any stop delay, according to the set stop program (34) or after expiry of a set maximum period (tmax) if the minimum temperature (Tmin) has not been reached after this maximum period (tmax).

13. The method according to claim 12, wherein if during the execution of the recirculation program (35) the temperature (T) of the compressed gas or the oil does not reach the required minimum temperature (Tmin) after a maximum period (tmax), the stop program is executed.

14. The method according to claim 12, wherein if during the execution of the recirculation program (35) the temperature (T) of the compressed gas or the oil does not reach the required minimum temperature (Tmin) after a maximum period (tmax), executing the stop program (34) and increasing an error counter (f) to indicate how many times this situation has occurred.

15. The method according to claim 12, wherein a minimum period (t'min) is set between 0 and 60 seconds.

16. The method according to claim 12, wherein a maximum period (tmax) is set between 0 and 40 minutes.

17. A method for preventing condensate in the oil of an oil-injected compressor (1) comprising an oil-injected compressor element (2) with an inlet (6) that can be closed by means of a controlled inlet valve (7) and an outlet (10); a drive (5) for the compressor element (2); an oil circuit (20) comprising an oil separator (13) with an input that is connected to the outlet (10) of the compressor element (2) and an output to which a consumer network (16) for compressed gas can be connected, whereby this oil separator (13) comprises a pressure vessel (12) in which the oil (21) separated from the compressed gas is received and from where oil can be injected into the compressor element (2); a controller (28) for the drive of the compressor element (2) that is such that when the pressure (p) in the consumer network (16) has reached a set maximum value (pmax), the drive (5) of the compressor element (2) is stopped according to a set stop program (34), wherein before the drive (5) of the compressor element (2) is stopped when the maximum pressure (pmax) in the consumer network (16) has been reached, the method comprises the following steps:
  determining the temperature (T) of the compressed gas or of the oil;
  when this temperature (T) is higher than a set fixed or calculated minimum value (Tmin) to minimize condensate in the oil, stopping of the drive (5) of the compressor element (2) according to the set stop program (34);
  when this temperature (T) is lower than the set fixed or calculated minimum value (Tmin), continuing to run the drive (5) with an open inlet valve (7) according to a recirculation program (35) in the controller (28) in order to continue compressing gas and recirculate this compressed gas from the oil separator (13) via a recirculation pipe (30) to the inlet (7) of the compressor element (2) in order to raise the temperature (T) until the fixed or calculated minimum temperature (Tmin) is reached and then stopping the drive (5),
  wherein if during the execution of the recirculation program (35) the temperature (T) of the compressed gas or the oil does not reach the required minimum temperature (Tmin) after a maximum period (tmax), executing the stop program (34).

18. A method for preventing condensate in the oil of an oil-injected compressor (1) comprising an oil-injected compressor element (2) with an inlet (6) that can be closed by means of a controlled inlet valve (7) and an outlet (10); a drive (5) for the compressor element (2); an oil circuit (20) comprising an oil separator (13) with an input that is connected to the outlet (10) of the compressor element (2) and an output to which a consumer network (16) for compressed gas can be connected, whereby this oil separator (13) comprises a pressure vessel (12) in which the oil (21) separated from the compressed gas is received and from where oil can be injected into the compressor element (2); a controller (28) for the drive of the compressor element (2) that is such that when the pressure (p) in the consumer network (16) has reached a set maximum value (pmax), the drive (5) of the compressor element (2) is stopped according to a set stop program (34), wherein before the drive (5) of the compressor element (2) is stopped when the maximum pressure (pmax) in the consumer network (16) has been reached, the method comprises the following steps:
  determining a temperature (T) of the compressed gas or of the oil;
  when this temperature (T) is higher than a set fixed or calculated minimum value (Tmin) to minimize condensate in the oil, stopping of the drive (5) of the compressor element (2) according to the set stop program (34);
  when this temperature (T) is lower than the set fixed or calculated minimum value (Tmin), continuing to run the drive (5) with an open inlet valve (7) according to a recirculation program (35) in the controller (28) in order to continue compressing gas and recirculate this compressed gas from the oil separator (13) via a recirculation pipe (30) to the inlet (7) of the compressor element (2) in order to raise the temperature (T) until the fixed or calculated minimum temperature (Tmin) is reached and then stopping the drive (5), wherein during the execution of the recirculation program (35) the drive (5) of the compressor element (2) is immediately stopped when the temperature (T) is higher than a set maximum temperature (Tmax) that is higher than the set fixed or calculated minimum value (Tmin) of the temperature.

* * * * *